Patented Dec. 25, 1945

2,391,742

UNITED STATES PATENT OFFICE 2,391,742

SYNTHETIC RUBBER COMPOSITIONS

Alvin V. Roberts, West Haven, Conn., assignor to General Electric Company, a corporation of New York No Drawing. Application April 1, 1943, Serial No. 481,460

15 Claims. (Cl. 260—79)

The present invention relates to synthetic rubber compositions and more particularly to synthetic rubber compositions comprising elastic copolymers of mono and diolefines known to the trade, for example, under the name of "butyl rubber." A synthetic rubber composition of this type which is, generally speaking, an elastic, linear, aliphatic, hydrocarbon interpolymer of a major proportion of a branched-chain mono-olefine such as isobutylene and a minor proportion of a conjugated diolefine such as butadiene or isoprene, differs from other vulcanizable polymers in that it possesses a very low degree of unsaturation. Hence, products made from it are unusually resistant to those agents reactive at the double bond, for example, ozone, oxygen, nitric acid, etc. While such resistance to physical and chemical agents is highly desirable, this advantage is offset by the fact that long periods of time are required to cure such compositions by the conventional type of accelerators used in the vulcanization of natural rubber compositions such as thiurams and dithiocarbamates with sulfur. For example, a composition containing (parts by weight):

Example 1

| | |
|---|---:|
| Copolymer of mono and diolefines (butyl rubber) | 100 |
| ZnO | 5 |
| Stearic acid | 3 |
| Gilder's whiting | 60 |
| Sulfur | 1.5 |
| Tetramethylthiuramdisulfide | 1 | requires between 50 and 60 minutes at approximately 300° F. for an optimum cure, yielding a product of tensile strength of approximately 950 lbs./sq. in., which product, however, deteriorates rapidly at 300° F.

While rapid cures may be obtained with copolymers of mono and diolefines by using a combination of lead peroxide and p-quinone dioxime and such compositions exhibit good ozone resistance and good ageing in 300° F. oven as well as good electrical properties, they have the disadvantage of being extremely scorchy even at 220° F. For example, a composition containing (parts by weight):

Example 2

| | |
|---|---:|
| Copolymer of mono and diolefines (butyl rubber) | 40 |
| Micronex | 4 |
| Paraffin | 2 |
| Stearic acid | 1.5 |
| #33 clay | 46.1 |
| Forum 40 oil | 2 |
| ZnO | 2 |
| P-quinone dioxime | 1 |
| $PbO_2$ | 1.4 | gives a product having a tensile strength of 690 lbs./sq. in. in 15 minutes at 220° F. and 820 lbs./sq. in. in 15 minutes at 300° F. showing curing rates to be comparable at both temperatures. Precure often occurs during ordinary milling procedures, so that the use of such a combination is impractical.

One criterion for scorch freedom is the requirement that a compound shall exhibit a tensile strength of not more than 75 lbs./sq. in. when given a cure of 8–15 minutes at 220° F. and that such a "cured" slab shall be remillable to a smooth consistency. Thus, for a substance to be considered a practical scorch retarder it would have to greatly reduce the 220° F. curing rate but permit a conventionally good curing rate at 300° F. Salicylic acid, traditionally used with natural rubber as a scorch retarder, does not retard the precure of the copolymer composition containing lead peroxide and p-quinone dioxime. Likewise, reducing agents in general apparently do nothing more than inactivate a portion of the peroxide. Such substances which heretofore have reduced scorching at 220° F. of copolymers of mono and diolefines, as shown by tensile studies, have also had the effect of greatly reducing tensile values at 300° F., so that no valuable improvement was accomplished. Altering the ratio of p-quinone dioxime to $PbO_2$ was also found to reduce the 220° F. tensile, but again the 300° F. tensile was correspondingly reduced, so that true retardation is not obtained.

I have found that copolymers of mono and diolefines, such as butyl rubber, for example, can be successfully cured at 300° F. with freedom from scorch at 220° F. by combining with the p-quinone dioxime and the lead peroxide in the composition, sulfur and compounds of the class consisting of thiurams and dithiocarbamates. This is a most surprising fact, as compounds of this general class and sulfur are, as heretofore pointed out, curing agents for butyl rubber. The novelty of the present invention resides in the dual role played by this class of compounds in such a combination, for they act as vulcanization retarders at lower temperatures and as co-accelerators of vulcanization at elevated temperatures. This is a most unexpected phenomenon and one which could not be deduced in any manner from previously known facts. Its importance is indicated by the fact that vulcanizates are produced from butyl rubber which cure rapidly, retain the good ageing and ozone resistance of the composition cured with lead peroxide and p-quinone dioxime, and exhibit tensile strengths superior to those of the lead peroxide and p-quinone dioxime combination used alone.

For example, the following compound (parts by weight):

Example 3

| | |
|---|---|
| Butyl rubber | 40 |
| Micronex | 4 |
| Paraffin | 2 |
| Stearic acid | 1.5 |
| Clay | 45.35 |
| Forum 40 oil | 2 |
| ZnO | 2 |
| Selenium diethyldithiocarbamate | 3 |
| MgO (h.c.) | 7 |
| P-quinone dioxime | 1 |
| PbO$_2$ | 1.4 |
| Sulfur | .6 | can be successfully cured in 12½ minutes at 300° F. to yield a product having a tensile strength of the order of 900 to 1000 lbs./sq. in., and which does not show any sign of cure even in 30 minutes at 220° F. Moreover, such a product exhibits good electrical properties, good ageing characteristics at 300° F. and good ozone resistant properties.

As pointed out, the invention, broadly speaking, consists in combining with p-quinone dioxime and a peroxide such as lead peroxide, sulfur and a compound of the type represented by the thiurams and dithiocarbamates in order to cure successfully at 300° F. with freedom from scorch at 220° F. compositions comprising copolymers of mono and diolefines. However, it has been found that rapid cures may be obtained, without scorching, when only p-quinone dioxime is used with compounds of the type indicated with or without sulfur and also when only lead peroxide is used with the compounds of the type indicated with or without sulfur. Vulcanizates so obtained do not have the optimum ageing and modulus characteristics obtained when both p-quinone dioxime and the peroxide are used in combination with sulfur and the compounds of the type disclosed.

Although the above example shows the use of selenium diethyldithiocarbamate specifically, other substances of the class stated above may be used in carrying out my invention and illustrative of such substances are the following:

Zinc dimethyldithiocarbamate
Zinc diethyldithiocarbamate
Zinc dibutyldithiocarbamate
Lead dimethyldithiocarbamate
Piperidinium pentamethylenedithiocarbamate
Reaction product of methylene dipiperidine and CS$_2$
Zinc dibenzyldithiocarbamate
Zinc pentamethylenedithiocarbamate
Bis-(benzal dimethyldithiocarbamate)
Dinitrophenyldimethyldithiocarbamate)
Tetramethylthiuram monosulfide
Tetramethylthiuram disulfide
Tetraethylthiuram disulfide
Dipentamethylene thiuram tetrasulfide
Selenium dimethyldithiocarbamate
Tellurium dimethyldithiocarbamate
Tellurium diethyldithiocarbamate
Lead diethyldithiocarbamate
Lead dibutyldithiocarbamate
Silver dibutyldithiocarbamate
Silver di-n-octyl dithiocarbamate
Ferrous dibutyldithiocarbamate
Sodium diethyldithiocarbamate
Nickel (ous) dibutyldithiocarbamate
Magnesium dibutyldithiocarbamate
Diethyl ammonium diethyldithiocarbamate
Dibutyl ammonium dibutyldithiocarbamate
Mono-n-octyl ammonium mono-n-octyl dithiocarbamate
Di-n-octyl ammonium di-n-octyl dithiocarbamate
Diphenyl ammonium diphenyldithiocarbamate
Benzyl ammonium dimethyldithiocarbamate
Benzyl ammonium pentamethylenedithiocarbamate
Tetraethyl thiuram monosulfide
Tetra n-butyl thiuram monosulfide
Dipentamethylene thiuram monosulfide
Tetra n-butyl thiuram disulfide
Dipentamethylene thiuram disulfide
Tetramethyl thiuram tetrasulfide
Aluminum dibutyldithiocarbamate
Chromic dibutyldithiocarbamate
Manganous dibutyldithiocarbamate
Cuprous dibutyldithiocarbamate
Cupric dibutyldithiocarbamate
Cobalt (ous) dibutyldithiocarbamate
Cadmium dibutyldithiocarbamate
Uranyl dibutyldithiocarbamate The versatility of the present invention for use in elastometer compounding is demonstrated by the fact that it may be used for all types of compounds ranging from pure gum stocks to high carbon black loaded stocks, such as are used in the manufacture of tires. As an illustration, a compound comprising (parts by weight):

Example 4

| | |
|---|---|
| Butyl rubber | 55 |
| Stearic acid | 1.65 |
| Cabot's #9 Spheron | 25.565 |
| Zinc oxide | 2.75 |
| H. C. MgO | 7.15 |
| Selenium diethyldithiocarbamate | 4.92 |
| P-quinone dioxime | .49 |
| PbO$_2$ | 1.65 |
| Sulfur | .825 | shows no signs of cure in 15 minutes at 220° F. but yields a product having a tensile strength of 1850 lbs./sq. in. in ten minutes at 300° F., while a compound comprising (parts by weight):

Example 5

| | |
|---|---|
| Butyl rubber | 100 |
| Stearic acid | 3 |
| ZnO | 5 |
| P-quinone dioxime | 1.25 |
| PbO$_2$ | 1.75 |
| Selenium diethyldithiocarbamate | 3.75 |
| H. C. MgO | 8.75 |
| Sulfur | 1.5 | shows no signs of cure in 15 minutes at 220° F., and yields a product having a tensile strength of 1450 lbs./sq. in. in 12½ minutes at 300° F.

The invention is not limited to the use of inorganic peroxides such as lead peroxide; organic peroxides such as benzoyl peroxide, or 3,4-dichloro benzoyl peroxide, may be used. For example (parts by weight):

Example 6

| | |
|---|---|
| Butyl rubber | 40 |
| Micronex | 4 |
| Paraffin | 2 |
| Stearic acid | 1.5 |
| #33 clay | 35.25 |
| Forum 40 oil | 2 |
| ZnO | 2 |
| Sulfur | .6 |
| P-quinone dioxime | .5 |
| Benzoyl peroxide | 2 |
| Selenac | 3 |
| H. C. MgO | 7 | gives a product showing a zero tensile in 15 minutes at 220° F. and tensile strengths of 800 to 900 lbs./sq. in. in 10 to 12½ minutes at 300° F.

It will, of course, be understood by those skilled in the art that plasticizers, plasticators, softeners, reinforcing agents, fillers, etc., employed in conventional rubber compounding, may be used.

What I claim as new and desire to secure by Letters Patent of the United States is:

1. A vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) a peroxide, (4) sulfur and (5) a compound of the class consisting of thiurams and dithiocarbamates, the total amount of the ingredients of (2), (3), (4) and (5) and their relative proportions being such that the said composition is capable of being cured at 300° F. with freedom from scorch at 220° F.

2. A vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) lead peroxide, (4) sulfur and (5) selenium diethyldithiocarbamate, the total amount of the ingredients of (2), (3), (4) and (5) and their relative proportions being such that the said composition is capable of being cured at 300° F. with freedom from scorch at 220° F.

3. A vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) lead peroxide, (4) sulfur and (5) zinc dibutyldithiocarbamate, the total amount of the ingredients of (2), (3), (4) and (5) and their relative proportions being such that the said composition is capable of being cured at 300° F. with freedom from scorch at 220° F.

4. A vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) lead peroxide, (4) sulfur and (5) tetraethylthiuram disulfide, the total amount of the ingredients of (2), (3), (4) and (5) and their relative proportions being such that the said composition is capable of being cured at 300° F. with freedom from scorch at 200° F.

5. The product of vulcanization of the vulcanizable composition of claim 1.

6. The product of vulcanization of the vulcanizable composition of claim 2.

7. The product of vulcanization of the vulcanizable composition of claim 3.

8. The product of vulcanization of the vulcanizable composition of claim 4.

9. A vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) lead peroxide, (4) sulfur and (5) a dithiocarbamate, the total amount of the ingredients of (2), (3), (4) and (5) and their relative proportions being such that the said composition is capable of being cured at 300° F. with freedom from scorch at 220° F.

10. A vulcanizable composition comprising (1) an elastic, linear hydrocarbon copolymer of a major proportion of branched-chain mono-olefine and a minor proportion of conjugated diolefine, said copolymer of (1) having incorporated therein (2) a peroxide and (3) a compound of the class consisting of thiurams and dithiocarbamates, the total amount of the ingredients of (2) and (3) and their relative proportions being such that the said composition is capable of being cured at 300° F. with freedom from scorch at 220° F.

11. The product of vulcanization of the vulcanizable composition of claim 9.

12. The product of vulcanization of the vulcanizable composition of claim 10.

13. A vulcanizable composition comprising (1) an elastic, linear hydrocarbon copolymer of a major proportion of isobutylene and a minor proportion of isoprene, said copolymer of (1) having incorporated therein (2) p-quinone dioxime, (3) lead peroxide, (4) sulfur and (5) selenium diethyldithiocarbamate, the total amount of the ingredients of (2), (3), (4) and (5) and their relative proportions being such that the said composition is capable of being cured at 300° F. with freedom from scorch at 220° F.

14. The product of vulcanization of the vulcanizable composition of claim 13.

15. The process which comprises vulcanizing at a temperature of the order of 300° F. a vulcanizable composition comprising (1) an elastic, linear hydrocarbon copolymer of a major proportion of branched-chain mono-olefine and a minor proportion of conjugated diolefine, said copolymer of (1) having incorporated therein (2) p-quinone dioxime, (3) a peroxide, (4) sulfur and (5) a compound of the class consisting of thiurams and dithiocarbamates, the total amount of the ingredients of (2), (3), (4), and (5) and their relative proportions being such that the said composition is capable of being cured at 300° F. with freedom from scorch at 220° F.

ALVIN V. ROBERTS.